Figure 1:
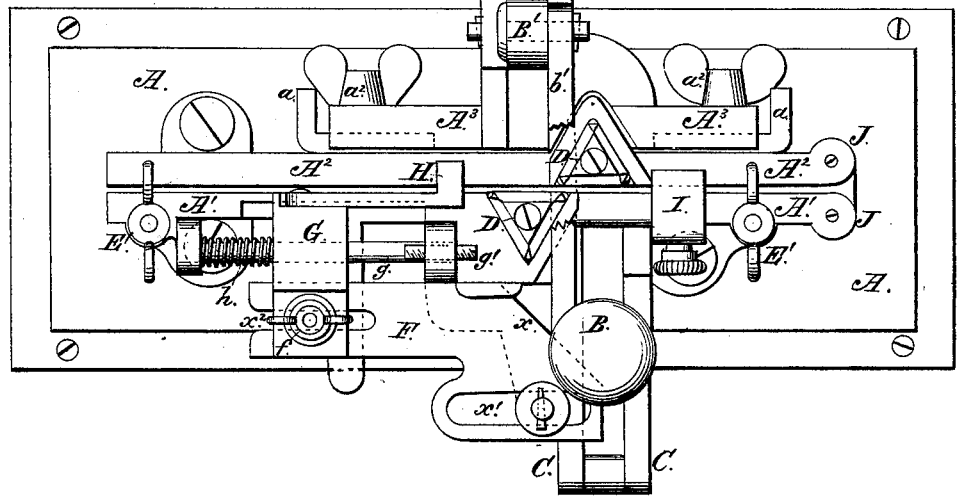

2 Sheets—Sheet 1.

W. DUNN.
Saw-Setting Machine.

No. 213,637. Patented Mar. 25, 1879.

Attest:
H. H. Schott,
Geo. T. Brereton

Inventor:
William Dunn
Per Wm. H. Brereton, Atty.

W. DUNN.
Saw-Setting Machine.
No. 213,637. Patented Mar. 25, 1879.
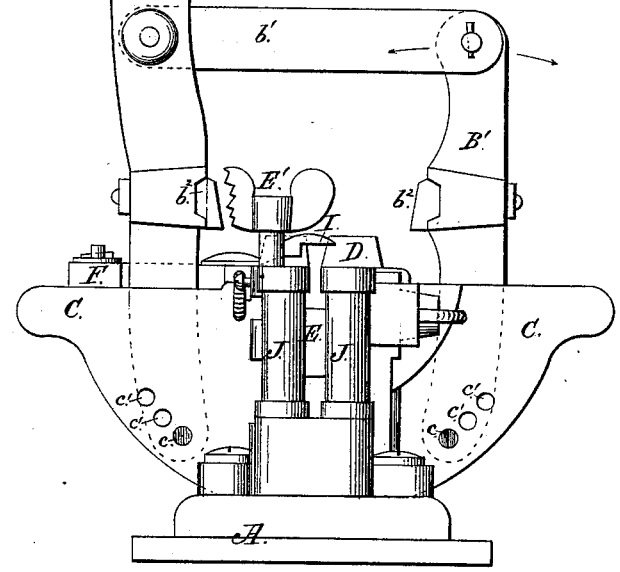
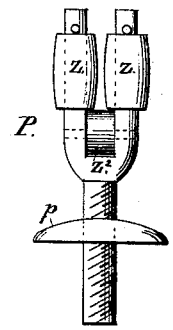
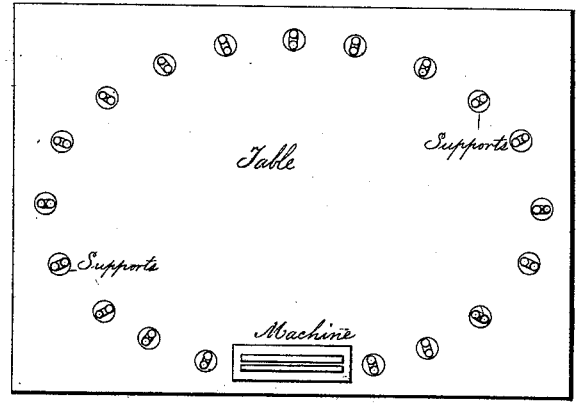

UNITED STATES PATENT OFFICE.

WILLIAM DUNN, OF HAMILTON, ONTARIO, CANADA, ASSIGNOR TO ISAAC BALDWIN McQUESTEN, OF SAME PLACE.

IMPROVEMENT IN SAW-SETTING MACHINES.

Specification forming part of Letters Patent No. 213,637, dated March 25, 1879; application filed December 31, 1878.

*To all whom it may concern:*

Be it known that I, WILLIAM DUNN, of the city of Hamilton, county of Wentworth, Province of Ontario, Dominion of Canada, have invented certain new and useful Improvements in Machines for Setting the Teeth of Saws, and more especially the teeth of band-saws, and of which the following is a full, clear, and exact description, reference being had to the accompanying drawings, which form part of the same.

My invention consists, first, in constructing the clamping-jaws along their faces with vertical recesses, and an adjustable rest constructed with a series of projections or corrugations on each side adapted to fit between said jaws for the purpose of preventing the saw falling below the upper edge of the rest, or between it and either jaw when they are open, and at the same time to allow the clamping-jaws to come sufficiently close together to securely clamp the saw. The rest is capable of being raised or lowered by means of screws or other appliances to accommodate saws of various widths.

My invention consists, secondly, in a pair of levers connected together by a bar, each lever provided with an adjustable pean, operating in connection with an adjustable and removable plate on each side of the clamping-jaws, said levers being adjustably pivoted at their ends at each side of the jaws to lugs provided with a series of holes, the holes allowing the pivot end of the levers to be elevated or depressed, as may be required.

My invention consists, thirdly, in lugs formed on both sides of the machine for the purpose of containing and pivoting the levers, and these lugs are provided with a number of pivot-holes for the purpose of arranging the levers to assume any desired angle at the point of contact with the saw-teeth.

My invention consists, fourthly, in combining with the principal lever an arrangement of devices or mechanism for moving the saw forward as the teeth are being set, the same consisting of a sliding plate reciprocating at right angles to the oscillation of the lever, constructed with a portion of its face inclined and a portion straight, and at its rear portion with a slot-connecting block, adjustably secured to the plate by set-screw, draw-hook pivoted to the connecting block, and spring for retracting the parts, all constructed and arranged to operate as and for the purposes hereinafter more fully set forth and shown.

My invention consists, fifthly, in a novel, removable, independent support for that part of the saw extending beyond the clamps or jaws, composed of a screw-shank with movable clamping-collar, two vertical axes provided with anti-friction rollers, and horizontal anti-friction roller, as and for the purposes hereinafter more fully described.

Figure 3:
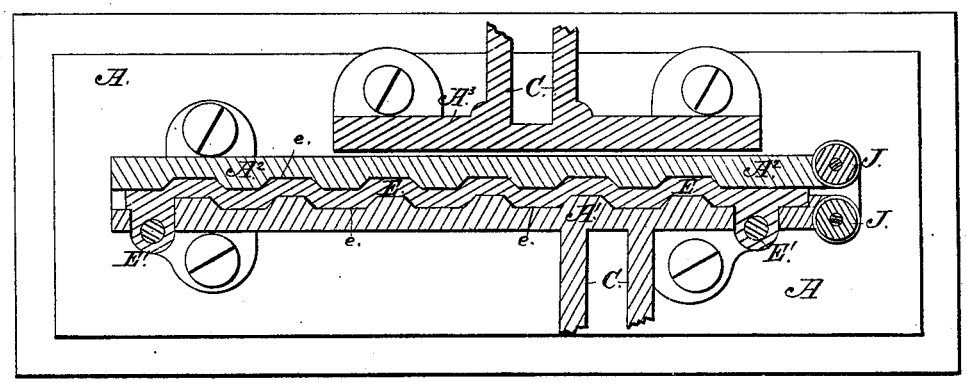

In the drawings, Figure 1 is a plan; Fig. 2, an end elevation; Fig. 3, a longitudinal sectional plan; Fig. 4, a detached view of the saw-support; and Fig. 5, a diagram, showing the arrangement of the machine when a band-saw is being operated upon.

A is the bottom plate of the machine; $A^1$, the fixed clamp-jaw attached to the bottom plate A. $A^2$ is the movable clamp-jaw, so constructed for the purpose of being adjustable for saws of different thicknesses. $A^3$ is a standard, situated behind $A^2$ and securely fixed to the bottom plate, A, for the purpose of affording a support to the movable jaw $A^2$. This standard $A^3$ also contains the lugs C C, to which the secondary lever B′ is pivoted, and between which the said lever oscillates.

*a a* are wedges inserted between the movable clamp-jaw $A^2$ and the standard $A^3$, and are for the purpose of pressing the jaw $A^2$ against the saw. They are constructed with an oblong slot, made to correspond with holes formed in the movable jaw $A^2$ and the fixed standard $A^3$, all for the purpose of containing the compression-bolts $a^2 a^2$, which are for the purpose of pressing the clamp-jaw $A^2$ and the wedges *a a* against the standard $A^3$ and holding them rigidly together. The aforesaid slots allow, when the bolts $a^2 a^2$ are slackened, the wedges to be drawn out sufficiently to open the clamp-jaws, so as to admit the saw or permit its being taken out.

B B′ are levers pivoted to and between the lugs C C, and are provided with peans made of steel or other suitable material, and are for the purpose of setting the saw-teeth. By oscillating these levers the peans fixed thereon are brought to bear on the teeth, bending them to the required angle. The lever B is also arranged so as to operate the hook that draws the saw through the machine during the process or at the time of setting the teeth. This is accomplished by the principal lever, B, working against the incline formed on the end of the sliding plate F, thus propelling the said plate forward and at right angles to the oscillation of the levers. These levers are connected by the rod $b^1$, which causes them to work together, and are so arranged for the purpose of setting the saw-teeth alternately in opposite directions at each oscillation of the levers.

$b^2$ $b^2$ are the peans, fitting into transverse channels made for that purpose on the face of the levers B B', and secured thereto by means of bolts or otherwise, as may be deemed advisable. These peans are so situated on the levers as to fall against the plates D D, which are fixed on the upper edges of the clamp-jaws $A^1$ $A^2$ when the levers are oscillated, and they are also capable of being adjusted to the different pitch of tooth by reason of an oblong transverse hole or slot constructed in each lever, and through which the pean-bolt passes, the shape of these holes allowing the bolts, and thereby the peans attached thereto, to be moved nearer together or farther apart, as may be required.

C C C C are the lugs to which the levers B B' are pivoted, each pair of which are provided with a corresponding series of holes, $c'$ $c'$ $c'$, made on arc-lines of the same radius, and described from the upper and inner edges of the clamp-jaws; and these several sets of holes are arranged at different elevations. They are so constructed for the purpose of allowing the levers to be pivoted at different points, thus giving a greater or less angle to the peans when brought in contact with the teeth of the saw, thereby producing a greater or less degree of set, as may be required. These lugs, being constructed so as to extend upward some distance beyond the pivot-holes, serve also as guides to the levers when oscillating. The side bearing afforded to the levers by this construction relieves the pivot-bolts of side strain.

$c$ $c$ are the bolts passing through the lugs C C C C, and on which the levers B and B' are pivoted.

D D are the plates fastened on the upper edges of the clamp-jaws $A^1$ and $A^2$, and are each placed facing the lever pivoted on the opposite side of the machine, and form a back to receive the teeth as they are operated on by the lever opposite. These plates are formed with edges of different bevels to provide different angles of set, and when a certain degree of set is desired the edge of the plate having such incline is placed parallel to and flush with the inner face of the clamp-jaw.

E is the rest, situated between the clamp-jaws, and is for the purpose of affording a bearing for the back of the saw. This rest is adjustable, so as to be adapted to the different widths of saws, and can be raised or lowered by means of the screws E' E'. This rest is made with a series of jogs or corrugations on each side. These projections fit into recesses made for that purpose at intervals on the inner faces of the clamp-jaws, all for the purpose of preventing the possibility of the saw falling between the rest and either jaw, and also to preserve at intervals a perpendicular inner face to the clamp-jaws, and allow them to come sufficiently close together to press against both sides of the thinnest saw and hold it firmly.

E' E' are the thumb-screws that raise and lower the rest E. F is the sliding plate, running parallel to the machine, constructed with an incline at one end. This end of the plate reaches to, and the face of the incline lies behind, the lever B when the said lever is against the clamp.

When the lever is drawn back it imparts a motion to the plate at right angles to its own. The object of this arrangement is to provide a medium through which the saw can be drawn through the machine during the process of setting the teeth.

G is a block, bolted to the sliding plate F, and running on the horizontal rod $g$. To this block is pivoted the draw-hook H, and said block forms a connection between the draw-hook and the sliding plate F. H is the draw-hook, pivoted to the block G, and is for the purpose of engaging the teeth of the saw and drawing it forward at each forward motion of the plate F produced by the oscillation of the lever B. A set-screw, $g'$, is placed in the upper part of an ear on the bed of the machine, into which the rod $g$ is also inserted.

When the mechanism for drawing the saw is thrust back by means of the spring $h$, the block G strikes against the set-screw $g'$ and is stopped.

$h$ is a spiral spring, placed on the rod $g$, and is for the purpose of forcing the mechanism composed of the sliding plate F, block G, and draw-hook H back toward and behind the lever B when said lever oscillates toward the clamp-jaws.

I is a stop, fastened by means of a set-screw to either side of the machine, and having the top made so as to extend over the points of the saw-teeth, and is for the purpose of preventing the saw rising while passing through the clamps of the machine. This stop is also provided with a slot through which the set-screw passes, which is for the purpose of permitting the stop to be raised or lowered when required, to suit the different depths of teeth.

J J are rubber-covered rollers, situated at the end of the clamp-jaws and flush with the inner side thereof, and standing parallel to each other, for the purpose of securing a steadiness of motion to the saw when it is being drawn through the machine; but if ordinary care is exercised in working the machine, this last-named provision may be dispensed with.

P is a support, constructed with a shank and two vertical axes, provided with three anti-friction rollers, $z^2$, arranged horizontally and between the bases of the upright axes, and $z\ z$, one on each vertical axis above the horizontal roller, between which the saw is placed, all for the purpose of holding that part of the saw extending beyond the machine. The rollers permit the saw to pass easily between the supports as it proceeds through the setting-machine. Several of these supports are required to hold the saw, and they are placed at certain distances from each other on the board or bench to which the machine is fixed, and are kept in position by the shanks fitting into holes made for the purpose in said board or bench. These supports are also provided with the movable collar $p$, screwed on the shanks thereof, and which is for the purpose of raising or lowering the bearing so as bring it on a level with the rest E, contained within the clamps $A^1\ A^2$.

Having thus fully described my invention, what I claim as new, and desire to secure by Letters Patent, is—

1. In a saw-setting machine, the clamping-jaws $A^1\ A^2$, constructed along their faces with vertical recesses $e$, and adjustable rest E, with a series of projections or corrugations on each side adapted to fit between said jaws, substantially as and for the purposes described.

2. In a saw-setting machine, the levers B B', adjustably pivoted at each side of the jaws $A^1\ A^2$, connecting-bar $b^1$, adjustable peans $b^2\ b^2$, and plates D D, in combination, substantially as and for the purposes described.

3. In a saw-setting machine, the lugs C C secured to the bottom plate, A, at each side of the machine, forming the guides for the levers B B', and provided with the adjustment-holes $c\ c$, whereby the pivot-bearing of the levers may be adjusted, for the purposes described.

4. In a saw-setting machine, in combination with the pivoted lever B, the plate F, horizontally reciprocating at right angles to the oscillation of the lever, and constructed at its front portion with an inclined face, $x$, and at its rear portion with a slot, $x^2$, block G, with draw-hook H, adjustably secured to the plate F by set-screw $f$, and spring $h$, all constructed and arranged to operate substantially as and for the purposes described.

5. In a saw-setting machine, the removable independent support P, constructed with a screw-shank and two vertical axes, provided with anti-friction rollers $z\ z$, horizontal anti-friction roller $z^2$, and nut or collar $p$, substantially as and for the purposes described.

6. The improved saw-setting machine composed of the recessed jaws $A^1\ A^2$, adjustable corrugated rest E, oscillating levers B B' $b$, with peans $b^2\ b^2$, plates D D, stop I, and devices F G H $h$ for operating the saw-blade, all constructed and arranged to operate substantially as and for the purposes described.

Hamilton, November 19, 1878.

WM. DUNN.

Witnesses:
M. O'R. JARVIS,
EDMD. C. SWANN.